(12) United States Patent
Liu et al.

(10) Patent No.: US 12,235,285 B2
(45) Date of Patent: Feb. 25, 2025

(54) METHOD AND SYSTEM FOR QUANTIFYING DEGREE OF BLENDING OF VIRGIN AND AGED ASPHALT IN HOT RECYCLED ASPHALT MIXTURES (HRAM)

(71) Applicant: Tongji University, Shanghai (CN)

(72) Inventors: Liping Liu, Shanghai (CN); Mingchen Li, Shanghai (CN); Lijun Sun, Shanghai (CN); Lingxiao Liu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 410 days.

(21) Appl. No.: 17/827,703

(22) Filed: May 28, 2022

(65) Prior Publication Data

US 2023/0213550 A1 Jul. 6, 2023

(30) Foreign Application Priority Data

Jan. 6, 2022 (CN) .......................... 202210013797.3

(51) Int. Cl.
*G01Q 60/38* (2010.01)
*C08L 95/00* (2006.01)

(52) U.S. Cl.
CPC .............. *G01Q 60/38* (2013.01); *C08L 95/00* (2013.01)

(58) Field of Classification Search
CPC ......... C08L 95/00; G01Q 60/38; G01Q 60/32
See application file for complete search history.

(56) References Cited

U.S. PATENT DOCUMENTS

| | | | |
|---|---|---|---|
| 9,994,485 B2 * | 6/2018 | Warner | C04B 26/26 |
| 10,793,720 B2 * | 10/2020 | Puchalski | C08K 5/09 |
| 11,414,549 B2 * | 8/2022 | Allen | C08L 95/005 |
| 11,571,669 B2 * | 2/2023 | Liu | G01N 21/84 |

* cited by examiner

*Primary Examiner* — An H Do
(74) *Attorney, Agent, or Firm* — Wentsler LLC

(57) ABSTRACT

The present disclosure provides a method and system for quantifying a degree of blending of virgin and aged asphalt in HRAM. The method includes the following steps: first, constructing a relational equation between the microscale modulus of recycled asphalt in a fully blended state and the content of the aged asphalt; measuring the microscale modulus of the recycled asphalt, the microscale modulus of the aged asphalt, the microscale modulus of the virgin asphalt, and the content of the aged asphalt in the HRAM in situ; inputting the dates above into the relational equation to obtain the microscale modulus of the recycled asphalt in the fully blended state; and based on the microscale modulus of the recycled asphalt measured in situ and the microscale modulus of the recycled asphalt in the fully blended state, obtaining the degree of blending of the virgin and aged asphalt in the HRAM.

9 Claims, 8 Drawing Sheets

Measure the microscale modulus of the virgin asphalt, the microscale modulus of the aged asphalt, and the microscale modulus of recycled asphalt with different contents of aged asphalt to construct a relational equation between the microscale modulus of recycled asphalt in a fully fused state and the content of aged asphalt, and verify the reliability of the model

↓

Obtain the microscale modulus of the recycled asphalt, the microscale modulus of the aged asphalt, the microscale modulus of the virgin asphalt, and the content of the aged asphalt in the HRAM are measured based on the above model

↓

Measure the microscale modulus of the virgin asphalt, the microscale modulus of the aged asphalt, and the content of the aged asphalt in situ

↓

Obtain the degree of blending of the virgin and aged asphalt in the HRAM based on the microscale modulus of the recycled asphalt measured in situ and the microscale modulus of the recycled asphalt in the fully blended state

METHOD AND SYSTEM FOR QUANTIFYING DEGREE OF BLENDING OF VIRGIN AND AGED ASPHALT IN HOT RECYCLED ASPHALT MIXTURES (HRAM)

CROSS REFERENCE TO RELATED APPLICATION

This patent application claims the benefit and priority of Chinese Patent Application No. 202210013797.3, filed on Jan. 6, 2022, the disclosure of which is incorporated by reference herein in its entirety as part of the present application.

TECHNICAL FIELD

The present disclosure relates to the technical field of road engineering, and in particular to a method and system for quantifying a degree of blending of virgin and aged asphalt in hot recycled asphalt mixtures (HRAM).

BACKGROUND ART

In recent years, with increasing emphasis on sustainable utilization of resources, the hot-mix plant recycling technology has been more and more used in asphalt pavement reconstruction projects. The degree of blending of virgin and aged asphalt in recycled mixtures has also received more and more attention from researchers.

In the design process of hot recycled mixtures, the aged asphalt in the old material is usually regarded as being fully blended with the virgin asphalt, and the screening data of the aggregate extracted from the old material is used for the grading design. In fact, the virgin and aged asphalt in the recycled mixture cannot reach a fully blended state. The design of recycled mixtures based on the full blending hypothesis will lead to insufficient binder in the recycled mixture, which will affect the performance of the hot recycled mixtures. Therefore, the grading design can be performed scientifically only by correctly understanding the degree of blending of the virgin and aged asphalt in the recycled mixtures, so as to better ensure the pavement performance of the recycled mixtures.

Based on this, some scholars around the world have applied a variety of testing methods to observe the miscibility state of the virgin asphalt and the aged asphalt in the HRAM. Some scholars obtain recycled asphalt by extracting and recycling organic solvents or applying the virgin and aged asphalt in layers, and used indicators such as dynamic modulus, carbonyl content, and macromolecular percentage of recycled asphalt to quantify the blending state of the virgin and aged asphalt in the recycled asphalt. Some researchers also use the change of the performance of recycled mixtures to indirectly characterize the miscibility state of the virgin and aged asphalt. However, these methods are quite different from the actual blending process of the virgin and aged asphalt, or destroy the real mixing state of the virgin and aged asphalt in the recycled asphalt, and the obtained quantitative results cannot truly reflect the blending state of the virgin and aged asphalt in the mixtures. Therefore, how to directly, quickly, and accurately detect the mixing degree of the virgin and aged asphalt in the HRAM is an urgent problem for those skilled in the art to solve.

SUMMARY

In view of this, the present disclosure provides a method and system for quantifying a degree of blending of virgin and aged asphalt in HRAM based on the atomic force microscope (AFM) technology.

To achieve the above objective, the present disclosure provides the following technical solutions:

A method for quantifying a degree of blending of virgin and aged asphalt in HRAM includes the following steps:

step 1, constructing a relational equation between the microscale modulus of recycled asphalt in a fully blended state and the content of the aged asphalt;

step 2, measuring the microscale modulus of the recycled asphalt, the microscale modulus of the aged asphalt, the microscale modulus of the virgin asphalt, and the content of the aged asphalt in the HRAM in situ, where the content of the aged asphalt is the proportion of the aged asphalt in the recycled asphalt;

step 3, inputting the microscale modulus of the virgin asphalt, the microscale modulus of the aged asphalt, and the content of the aged asphalt measured in situ into the relational equation to obtain the microscale modulus of the recycled asphalt in the fully blended state; and step 4, based on the microscale modulus of the recycled asphalt measured in situ and the microscale modulus of the recycled asphalt in the fully blended state, obtaining the degree of blending of the virgin and aged asphalt in the HRAM.

Optionally, a method for constructing the relational equation between the microscale modulus of the recycled asphalt in the fully blended state and the content of the aged asphalt may be as follows:

preparing the recycled asphalt in the fully blended state with different contents of the aged asphalt;

obtaining the microscale modulus of the recycled asphalt in the fully blended state with different contents of the aged asphalt; and establishing a mathematical relationship between the content of the aged asphalt and the microscale modulus of the recycled asphalt in the fully blended state by taking the content of the aged asphalt as the x-axis and the microscale modulus of the recycled asphalt in the fully blended state as the y-axis through nonlinear fitting:

$$E_{DMT-mix} = A \times 10^{10^{B\left[\alpha\, \log\log(E_{DMT-aged}) + (1-\alpha)\log\log(E_{DMT-vrgin})\right]}},$$

where in the formula, $E_{DMT-mix}$ is the microscale modulus of the recycled asphalt in the fully blended state; $\alpha$ is the content of the aged asphalt in the recycled asphalt; $E_{DMT-aged}$ is the microscale modulus of the aged asphalt; $E_{DMT-virgin}$ is the microscale modulus of the virgin asphalt; and A and B are specific values.

Optionally, a method for preparing the recycled asphalt in the fully blended state with different contents of the aged asphalt may be as follows: adding virgin asphalt of different quality to the aged asphalt of a certain mass to prepare the recycled asphalt in the fully blended state with different contents of the aged asphalt.

Optionally, a mold for preparing the recycled asphalt in the fully blended state with different contents of the aged asphalt may be made of a high temperature resistant silica gel material.

Optionally, a mold for preparing the recycled asphalt in the fully blended state with different contents of the aged asphalt may be of a cuboid structure with the height of 7.5±0.5 cm and a bottom edge being a 9±0.5 cm*9±0.5 cm square.

Optionally, the center of the cuboid mold may be a cylinder depression with the height of 6±0.5 cm and the diameter of 7.5±0.5 cm.

Optionally, the value A may be 1.04, and the value B may be 0.99.

Optionally, the microscale modulus may be measured using the AFM technology.

Optionally, a method for calculating the degree of blending of the virgin and aged asphalt may be as follows:

$$DOB = \frac{DMT_{mea} - DMT_{vir}}{DMT_{pre} - DMT_{vir}},$$

DOB represents the degree of blending of the virgin and aged asphalt in the HRAM; $DMT_{mea}$ is the microscale modulus of the recycled asphalt measured in situ; $DMT_{pre}$ is the predicted microscale modulus of the recycled asphalt in the fully blended state; and $DMT_{vir}$ is the microscale modulus of the virgin asphalt measured in situ.

A system for quantifying a degree of blending of virgin and aged asphalt in HRAM includes:
 a relational equation construction module, configured to construct a relational equation between the microscale modulus of recycled asphalt in a fully blended state and the content of the aged asphalt;
 an actual measurement module for microscale modulus, configured to measure the microscale modulus of the recycled asphalt, the microscale modulus of the aged asphalt, the microscale modulus of the virgin asphalt, and the content of the aged asphalt in the HRAM in situ;
 a microscale modulus prediction module, configured to input the microscale modulus of the virgin asphalt, the microscale modulus of the aged asphalt, and the content of the aged asphalt measured in situ into the relational equation to obtain the microscale modulus of the recycled asphalt in the fully blended state; and
 an acquisition module for the degree of blending of the virgin and aged asphalt, configured to obtain the degree of blending of the virgin and aged asphalt in the HRAM based on the microscale modulus of the recycled asphalt measured in situ and the microscale modulus of the recycled asphalt in the fully blended state.

It can be seen from the above technical solution that the present disclosure provides the method and system for quantifying a degree of blending of virgin and aged asphalt in HRAM based on the AFM technology. Compared with the prior art, the present disclosure has the following beneficial effects:

The method for quantifying the degree of blending of virgin and aged asphalt in HRAM provided by the present disclosure is suitable for various common asphalt in the field of road engineering. The method is strong in applicability, simple in sample preparation, and stable in data results, and can accurately quantify the degree of blending of the virgin and aged asphalt in the recycled asphalt. The method of the present disclosure can quantify the degree of blending of the virgin and aged asphalt in the recycled asphalt when knowing the proportion of the aged asphalt in the recycled asphalt, avoiding the influence of the extraction and recovery process in the existing method on the blending state of the recycled asphalt. Non-destructive testing can be completed without destroying the blending state of the asphalt, and the blending state of the virgin and aged asphalt in the recycled asphalt is accurately reflected, so as to optimize the preparation process of the recycled mixtures and provide a theoretical basis for the design of high-performance recycled mixtures.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description merely show the embodiments of the present disclosure, and those of ordinary skill in the art may still derive other drawings from the provided accompanying drawings without creative efforts.

FIG. 1 is a schematic diagram of steps of a method of the present disclosure;

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

Embodiments of the present disclosure provides a method for quantifying a degree of blending of virgin and aged asphalt in HRAM. Referring to FIG. 1, the method includes the following steps.

Step 1, the microscale modulus of the virgin asphalt, the microscale modulus of the aged asphalt, and the microscale modulus of recycled asphalt with different contents of aged asphalt are measured to construct a relational equation between the microscale modulus of recycled asphalt in a fully blended state and the content of the aged asphalt, which is specifically as follows.

Step 1.1, virgin asphalt of different quality is added to the aged asphalt of a certain mass to prepare the recycled asphalt in the fully blended state with different contents of the aged asphalt.

Step 1.1.1, the aged asphalt and the virgin asphalt are put into an oven for preheating to a flow state.

Preferably, matrix asphalt is preheated at 160° C. for 15 min.

Preferably, modified asphalt is preheated at 170° C. for 15 min.

Step 1.1.2, a mold is put into an oven at 170±5° C. for heat preservation for 1-2 h to avoid cooling of the recycled asphalt during mixing.

Step 1.1.3, the preheated virgin and aged asphalt are added into the preheated mold, and specifically, the preheated virgin and aged asphalt is added into the preheated mold according to a preset mass. Specifically, based on the mass of the aged asphalt (such as 50±2 g), different recycled asphalt is simulated by changing the mass of the virgin asphalt added (40 g, 30 g, and 20 g).

Preferably, in the specific implementation process, the proportion of the aged asphalt added during mixing accounts for 30%, 40%, 50%, 60%, and 70% of the recycled asphalt.

Step 1.1.4, a mixer is used to continuously mix the mixed recycled asphalt at 200 rpm, and the recycled asphalt in the fully blended state is obtained by adjusting the mixing time.

Step 1.1.5, the evenly mixed asphalt is cooled at the room temperature for performance testing.

Optionally, the mold for preparing the recycled asphalt in the fully blended state with different contents of the aged asphalt is made of a high temperature resistant silica gel material.

Figure 3:
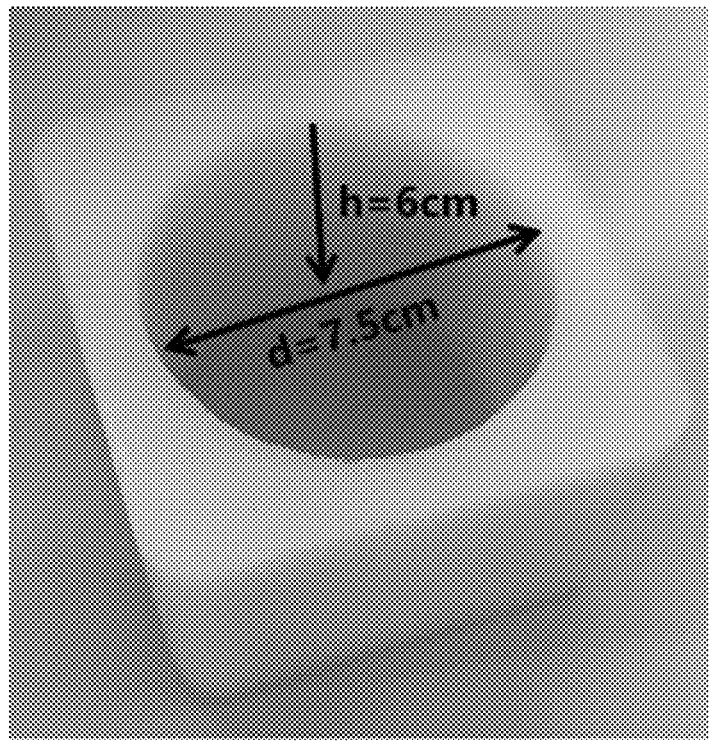
FIG. 3 is a schematic diagram of a mold used in an embodiment of the present disclosure.

Optionally, referring to FIG. 3, the mold for preparing the recycled asphalt in the fully blended state with different contents of the aged asphalt is of a cuboid structure with the height of 7.5±0.5 cm and a bottom edge being a 9±0.5 cm*9±0.5 cm square.

Optionally, the center of the cuboid mold is a cylinder depression with the height of 6±0.5 cm and the diameter of 7.5±0.5 cm.

Step 1.2, the microscale modulus of the recycled asphalt in the fully blended state with different contents of the aged asphalt is obtained.

The DMT modulus of the recycled asphalt in the fully blended state with different contents of the aged asphalt is tested with a peakforce quantitative nanomechanical mapping (PF-QNM) module in the AFM. The RFESPA model is used as the probe, and the Thermal Tune method (QNM test) is used as the calibration method. After calibration, the probe has an elastic modulus of 2.73 N/m, and a tip radius of 8 nm. Test parameters are the peak force threshold of 8 nN, the PFT Gain value of 15, the resolution of 256*256, the scan rate of 0.5 HZ, and the scan size of 20 μm*20 μm. During the test, the probe and test parameters are kept unchanged.

Further, the above microscale modulus is quantitatively analyzed, and the acquired modulus maps of the recycled asphalt with different degrees of blending are quantitatively analyzed using the professional software Nano scope Analysis attached to the AFM, so as to obtain the modulus of the recycled asphalt in the fully blended state with different contents of the aged asphalt.

Step 1.3, a mathematical relationship between the content of the aged asphalt and the microscale modulus of the recycled asphalt in the fully blended state is established by taking the content of the aged asphalt as the x-axis and the microscale modulus of the recycled asphalt in the fully blended state as the y-axis through nonlinear fitting:

$$E_{DMT-mix} = A \times 10^{10^{B[\alpha loglog(E_{DMT-aged}) + (1-\alpha) loglog(E_{DMT-virgin})]}}.$$

In the formula, DMT represents the microscale modulus; $E_{DMT-mix}$ is the microscale modulus of the recycled asphalt in the fully blended state; $\alpha$ is the content of the aged asphalt in the recycled asphalt; $E_{DMT-aged}$ is the microscale modulus of the aged asphalt; $E_{DMT-virgin}$ is the microscale modulus of the virgin asphalt; and A and B are specific values, the value A is 1.04, and the value B is 0.99.

Step 2, the microscale modulus of the recycled asphalt, the microscale modulus of the aged asphalt, the microscale modulus of the virgin asphalt, and the content of the aged asphalt in the HRAM are measured in situ. Specifically, the microscale modulus of the virgin asphalt on the surface of ordinary hot-mix mixtures, and the microscale modulus of the aged asphalt on the surface of the old RAP (that is, the mixture after a period of time of use, and the core sample needs to be cut to obtain a flat surface), and the microscale modulus of the recycled asphalt on the surface of the HRAM are measured in situ.

Step 2.1, a HRAM specimen is frozen for at least 24 h at −30° C.

Step 2.2, the HRAM specimen is cut into several 20 mm*20 mm*10 mm test blocks.

Step 2.3, the cut AFM specimen is washed with low temperature (5° C.) water to remove the dirt on the surface.

Step 2.4, the cut sample is placed in a cool place. After the water on the surface evaporates, a nanomodulus map of the recycled asphalt area in the mixtures is obtained using the PF-QNM module in the AFM.

Step 2.5, mechanical information of local pixels in a mechanical image and force curve information of each pixel during image acquisition are extracted using the Nanoscope Analysis software, and are quantified to obtain the microscale modulus of the recycled asphalt. In the same way, the microscale modulus of the virgin asphalt in the ordinary hot-mix mixtures and the microscale modulus of the aged asphalt in the RAP can be obtained.

The content of the aged asphalt can be obtained by burning in a combustion furnace or by extraction.

Step 3, the microscale modulus of the virgin asphalt, the microscale modulus of the aged asphalt, and the content of the aged asphalt measured in situ are input into the relational equation to obtain the microscale modulus of the recycled asphalt in the fully blended state. When the virgin and aged asphalt in the recycled mixtures is fully blended, that is, all the aged asphalt can be blended with the virgin asphalt. At this time, the proportion of the aged asphalt in the recycled asphalt is the proportion of the aged asphalt determined in the design of the recycled mixtures. The proportion of the aged asphalt and the DMT modulus of the virgin and aged asphalt are substituted into the formula to obtain the DMT modulus of the recycled asphalt when the virgin and aged asphalt is fully blended.

Step 4, based on the microscale modulus of the recycled asphalt measured in situ and the microscale modulus of the recycled asphalt in the fully blended state, the degree of blending of the virgin and aged asphalt in the HRAM is obtained.

A method for calculating the degree of blending of the virgin and aged asphalt is as follows:

$$DOB = \frac{DMT_{mea} - DMT_{vir}}{DMT_{pre} - DMT_{vir}},$$

DOB represents the degree of blending of the virgin and aged asphalt in the HRAM; $DMT_{mea}$ is the microscale modulus of the recycled asphalt actually measured; $DMT_{pre}$ is the microscale modulus of the recycled asphalt in the fully blended state predicted according to step 3; and $DMT_{vir}$ is the microscale modulus of the virgin asphalt.

Figure 2:
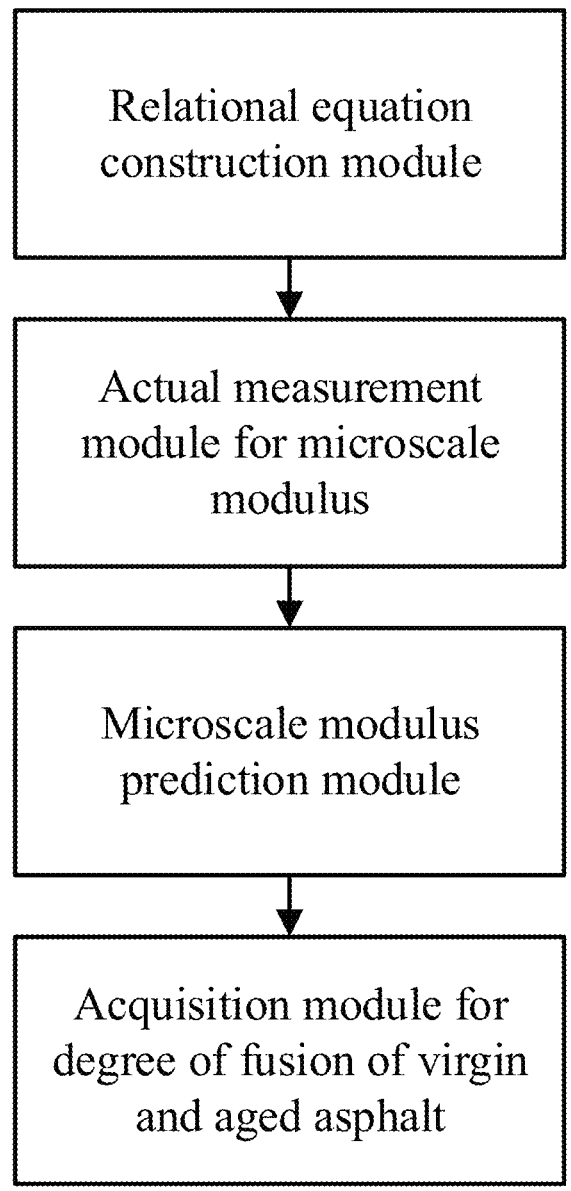
FIG. 2 is a schematic structural diagram of a system of the present disclosure.

A system for quantifying a degree of blending of virgin and aged asphalt in HRAM, referring to FIG. 2, includes a relational equation construction module, an actual measurement module for microscale modulus, a microscale modulus prediction module, and an acquisition module for the degree of blending of the virgin and aged asphalt.

The relational equation construction module is configured to construct a relational equation between the microscale modulus of recycled asphalt in a fully blended state and the content of the aged asphalt.

The actual measurement module for microscale modulus is configured to measure the microscale modulus of the recycled asphalt, the microscale modulus of the aged asphalt, the microscale modulus of the virgin asphalt, and the content of the aged asphalt in the HRAM in situ.

The microscale modulus prediction module is configured to input the microscale modulus of the virgin asphalt, the microscale modulus of the aged asphalt, and the content of the aged asphalt measured in situ into the relational equation to obtain the microscale modulus of the recycled asphalt in the fully blended state.

The acquisition module for the degree of blending of the virgin and aged asphalt is configured to obtain the degree of blending of the virgin and aged asphalt in the HRAM based on the microscale modulus of the recycled asphalt measured in situ and the microscale modulus of the recycled asphalt in the fully blended state.

The following section provides a specific embodiment to describe the technical solutions of the present disclosure.

The method of the present disclosure is applicable to both matrix asphalt and SBS modified asphalt. In the embodiments, the virgin asphalt and 3 aged asphalt with different degrees of aging are all 70 # matrix asphalt. Table 1 shows basic performance indicators of the virgin asphalt and the aged asphalt with three degrees of aging.

TABLE 1

Basic performance indicators of virgin asphalt and aged asphalt

| Type of asphalt | Penetration (25° C.)/0.1 mm | Softening point (° C.) | Ductility (15° C.)/cm |
|---|---|---|---|
| Virgin asphalt | 67.5 | 49.8 | >100 |
| Aged asphalt 1 | 31.6 | 61.7 | 9 |
| Aged asphalt 2 | 21.7 | 64.2 | 3 |
| Aged asphalt 3 | 15.6 | 68.9 | Brittle failure |

The old RAP used is the old artificial aging material for test, the asphalt is 70 # matrix asphalt, and the mineral material is basalt aggregate and limestone mineral powder. After mixing, the evenly mixed asphalt mixtures are placed in a tray, the thickness of the mixtures is controlled between 25 mm and 50 mm, and the mixtures are placed in an oven at 135° C. for 4 h to simulate the short-term aging process of the mixtures. The loose asphalt mixtures after short-term aging are placed in a drying oven at 95° C. Under this environmental condition, the mixtures are aged for 5 d and 10 d respectively to simulate two kinds of RAP with different degrees of aging, namely moderate and severe aging.

The new aggregate used in the recycled mixtures is limestone aggregate. The mix proportion design is carried out in accordance with the current technical specifications for asphalt pavement construction in China. In the grading design, the old material is based on the screening data after asphalt extraction, and the content of the RAP is 40%.

RAP is the moderately (RAP-A) and severely aged (RAP-B) mixtures prepared in the laboratory, and the correspondingly prepared recycled mixtures are named as recycled materials A (moderately aged) and recycled materials B (severely aged). The content of asphalt in both the RAP and the recycled material is 4.4%.

The method of the present disclosure includes the following specific steps.

Step 1, the recycled asphalt in the fully blended state with different contents of the aged asphalt is prepared.

Step 1.1, 50 g of the aged asphalt and the virgin asphalt are respectively put into an oven at 160° C. for preheating for 15 min to a flow state.

Step 1.2, a mold is put into an oven at 170° C. for heat preservation for 2 h to avoid cooling of the recycled asphalt during mixing.

Step 1.3, the virgin asphalt and 50 g of the aged asphalt after preheating are added into the preheated mold according to a certain proportion (the proportion of the virgin asphalt added accounts for 30%, 40%, 50%, 60%, and 70% of the recycled asphalt).

Step 1.4, a mixer is used to continuously mix the mixed recycled asphalt at 200 rpm for 1 min, and the recycled asphalt in the fully blended state with different contents of the aged asphalt is obtained.

Step 1.5, the evenly mixed asphalt is cooled at the room temperature for performance testing.

Figure 4A:
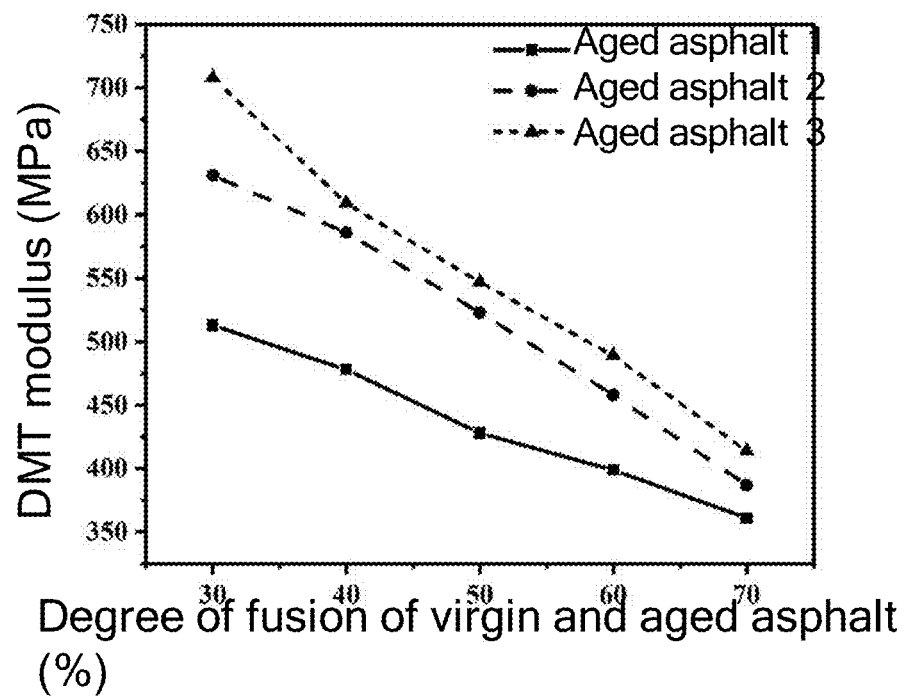
FIG. 4(a) is a schematic diagram of variation of flat dilatometer (DMT) modulus of recycled asphalt with different contents of aged asphalt according to an embodiment of the present disclosure.
Figure 4B:
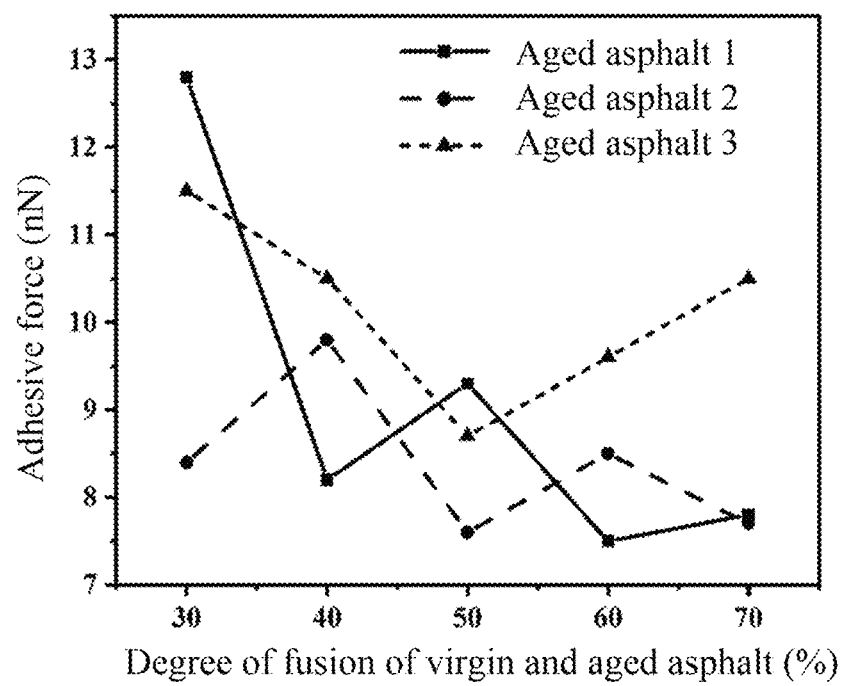
FIG. 4(b) is a schematic diagram of variation of an adhesive force of the recycled asphalt with different contents of aged asphalt according to the embodiment of the present disclosure.

Step 2, AFM observation samples of the recycled asphalt with different degrees of blending are prepared by the natural flow forming method of a sample dish, and the nanoscale mechanical performance of the recycled asphalt in the fully blended state with different contents of the aged asphalt is tested by the AFM technology. The nanoscale mechanical performance of the recycled asphalt in the fully blended state with different contents of the aged asphalt, the virgin asphalt, and the aged asphalt are obtained, and reference may be made to FIG. 4(a) to FIG. 4(b).

It can be seen that with the increase of the degree of blending of the virgin and aged asphalt in the recycled asphalt, the microscale DMT modulus (microscale modulus) of the asphalt gradually decreases, while the microscale adhesive force has no obvious change rule, indicating that compared with the adhesive force indicator, the microscale DMT modulus of the recycled asphalt is more suitable for quantifying the degree of blending of the virgin and aged asphalt in the recycled asphalt.

Step 3, a relational equation between the microscale modulus of recycled asphalt in a fully blended state and the content of the aged asphalt is constructed.

A mathematical relationship between the content of the aged asphalt and the microscale modulus of the recycled asphalt in the fully blended state is established by taking the content of the aged asphalt as the x-axis and the DMT modulus of the recycled asphalt in the fully blended state as the y-axis through nonlinear fitting.

Figure 5A:
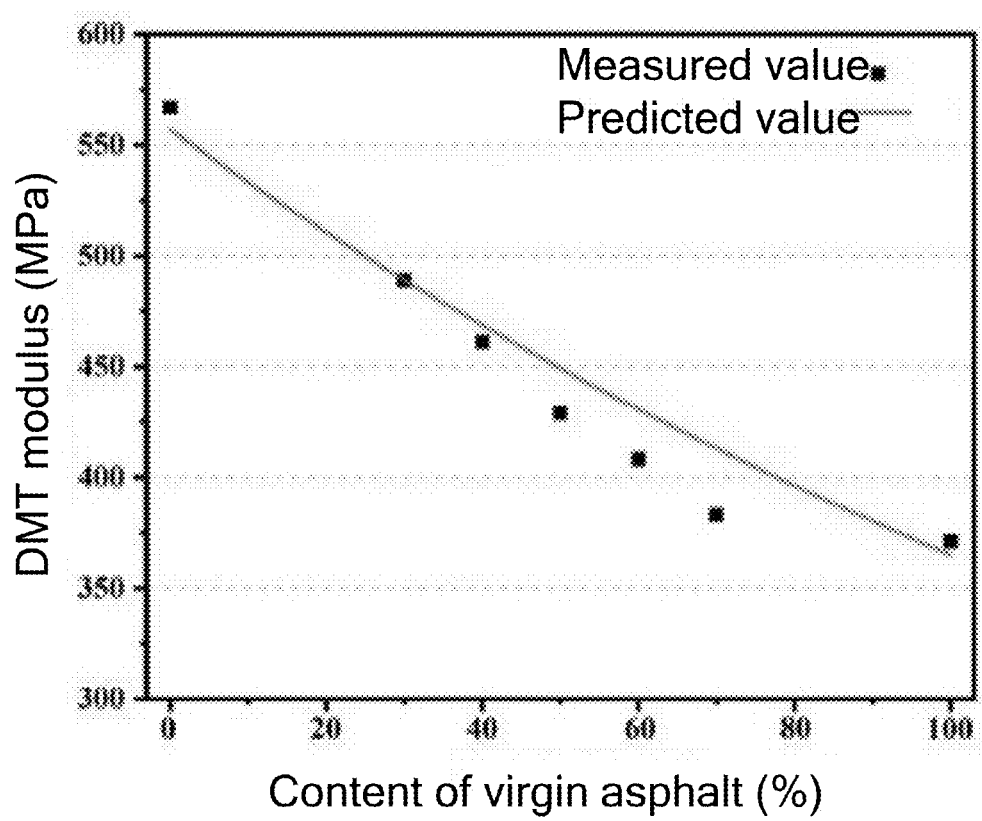
FIG. 5(a) is a schematic diagram showing comparison between a predicted value and a measured value of DMT modulus of recycled asphalt in different blending states when the aged asphalt is aged asphalt 1 in the embodiment of the present disclosure.
Figure 5B:
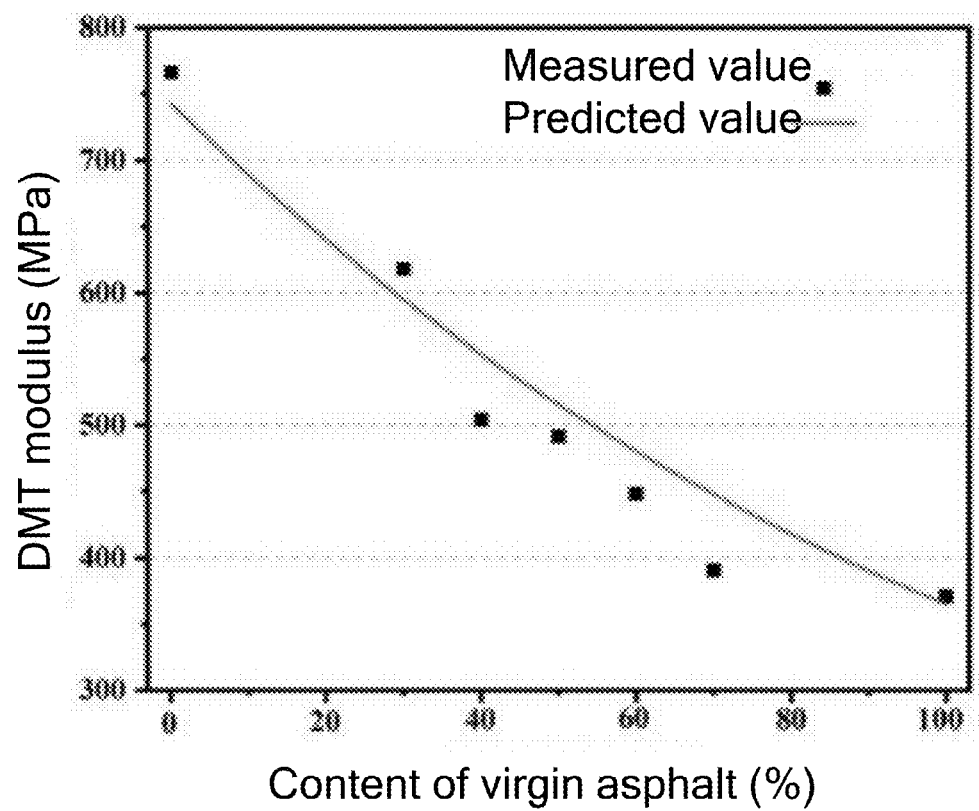
FIG. 5(b) is a schematic diagram showing comparison between a predicted value and a measured value of DMT modulus of recycled asphalt in different blending states when the aged asphalt is aged asphalt 2 in the embodiment of the present disclosure.
Figure 5C:
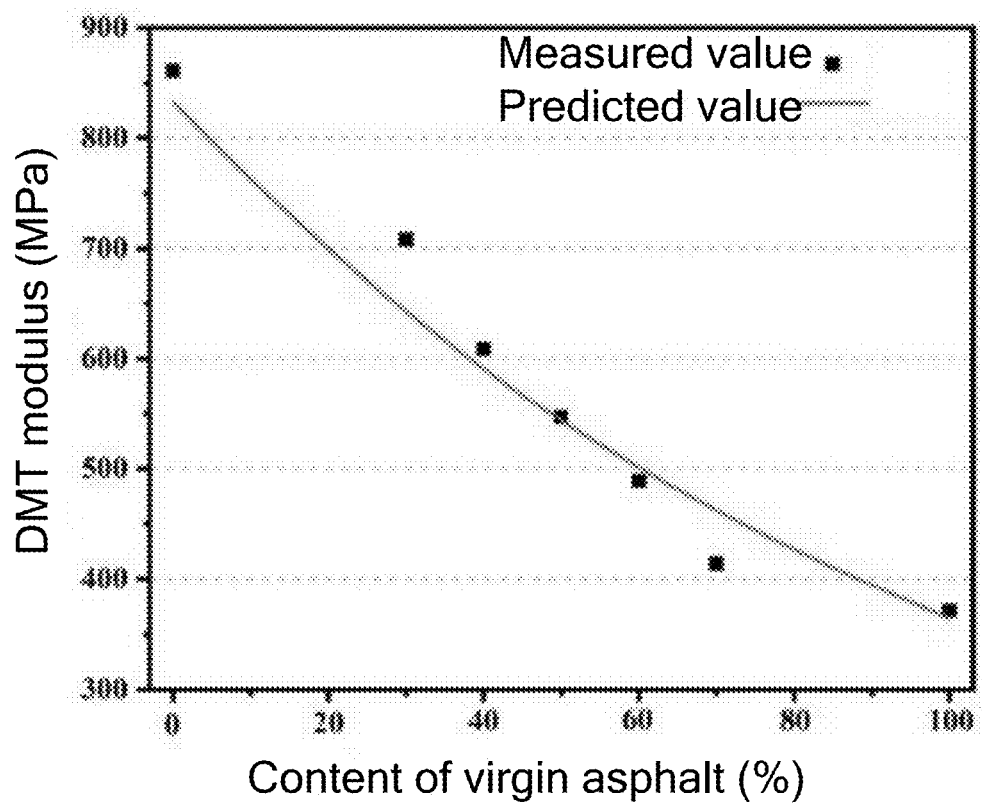
FIG. 5(c) is a schematic diagram showing comparison between a predicted value and a measured value of DMT modulus of recycled asphalt in different blending states when the aged asphalt is aged asphalt 3 in the embodiment of the present disclosure.

In order to verify the accuracy of the mathematical relationship established by the present disclosure, the predicted modulus of the blended asphalt in the corresponding blending state is obtained by taking the DMT modulus of the virgin asphalt and the aged asphalt as the input value, and is compared with the experimental value. For the results, reference may be made to FIG. 5(a) to FIG. 5(c).

It can be seen that for the aged asphalt with different degrees of aging, the method provided by the present disclosure can better predict the DMT modulus of the recycled asphalt in the fully blended state. Similarly, the degree of blending of the virgin and aged asphalt can also be quantified by the microscale DMT modulus of the asphalt.

In the subsequent specific process of the degree of blending of the virgin and aged asphalt, firstly, it is necessary to obtain the DMT modulus of the virgin asphalt and the aged asphalt. The microscale modulus of the asphalt in the recycled mixtures in the fully blended state is obtained based on the DMT modulus of the virgin asphalt in the hot-mix asphalt mixtures and the aged asphalt in the pavement core sample and the proportion of the aged asphalt added in the recycled mixtures with different contents of the old material.

Step 4, the DMT modulus of the virgin asphalt in the ordinary hot-mix mixtures (freshly mixed asphalt mixtures), the DMT modulus of the aged asphalt in the RAP, and the DMT modulus of the recycled asphalt in the HRAM are measured in situ.

Step 4.1, two recycled mixture specimens are frozen for at least 24 h at −30° C.

Step 4.2, the mixture specimens are cut into several 20 mm*20 mm*10 mm test blocks.

Step 4.3, the cut AFM specimen is washed with low temperature (5° C.) water to remove the dirt on the surface.

Step 4.4, the cut sample is placed in a cool place. After the water on the surface evaporates, a nanomodulus map of the recycled asphalt area in the mixtures is obtained using the PF-QNM module in the AFM.

Figure 6:
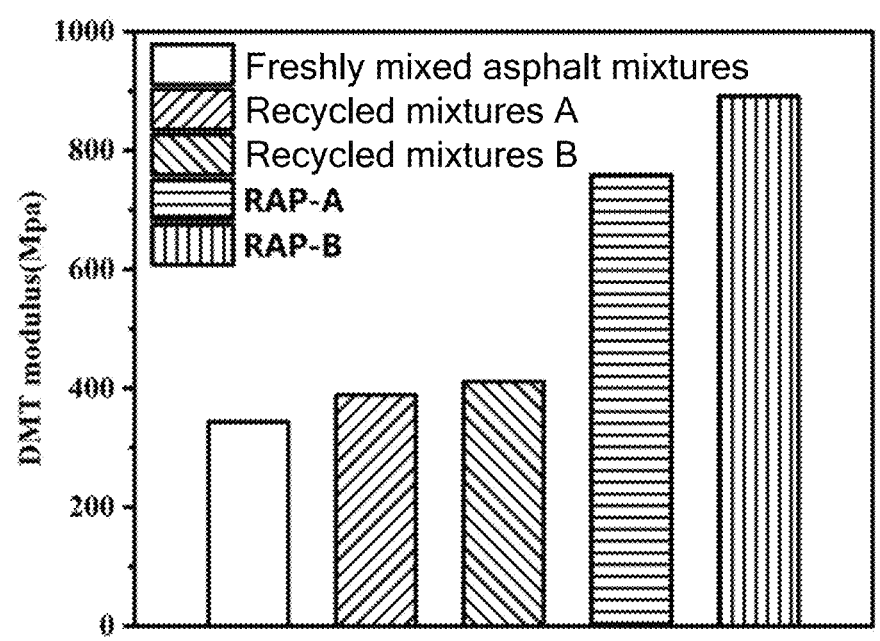
FIG. 6 is a schematic diagram of quantification results of DMT modulus of asphalt in freshly mixed asphalt mixtures, old reclaimed asphalt pavement (RAP) and HRAM in the embodiment of the present disclosure.

Step 4.5, mechanical information of local pixels in a mechanical image and force curve information of each pixel during image acquisition are extracted using the Nanoscope Analysis software, and are quantified to obtain the DMT modulus of the recycled asphalt in the recycled mixtures (referring to FIG. 6).

Step 5, the degree of blending of the virgin and aged asphalt in the two recycled mixtures are calculated, as shown in Table 2.

TABLE 2

Quantitative results of degree of blending of virgin and aged asphalt in two recycled mixtures

| Type of recycled mixtures | Degree of blending of virgin and aged asphalt in recycled mixtures |
|---|---|
| Recycled mixtures A | 70.1% |
| Recycled mixtures B | 63.9% |

It can be seen from Table 2 that the virgin and aged asphalt in the recycled mixtures with a content of 40% RAP after mixing cannot be fully blended. When the RAP is moderately aged, the degree of blending of the virgin and aged asphalt is 70.1%, and when the RAP material is severely aged, the degree of blending of the virgin and aged asphalt is 63.9%. A more serious degree of aging of the asphalt in the RAP indicates a lower degree of blending of the virgin and aged asphalt in the recycled mixtures after mixing. The result is consistent with the existing results in qualitative analysis, which proves the reliability of the non-destructive quantitative indicator and the method provided in the present disclosure.

It can be seen from the above embodiments that the method for quantifying a degree of blending of virgin and aged asphalt in HRAM provided by the present disclosure can complete the detection without destroying the blending state of the asphalt, and accurately reflect the blending state of the virgin and aged asphalt in the recycled asphalt, and the provided prediction model of the relationship between the microscale modulus of the recycled asphalt and the degree of blending of the virgin and aged asphalt can reasonably predict the degree of blending of the virgin and aged asphalt in the recycled asphalt, and perform non-destructive testing on the degree of blending of the virgin and aged asphalt without extraction and recycling.

Each embodiment of this specification is described in a progressive manner, each embodiment focuses on the difference from other embodiments, and the same and similar parts between the embodiments may refer to each other. Since a device disclosed in the embodiments corresponds to a method disclosed in the embodiments, its description is relatively simple, and relevant contents may be seen from partial description of the method.

The above description of the disclosed embodiments enables those skilled in the art to achieve or use the present disclosure. Various modifications to these embodiments are readily apparent to those skilled in the art, and the generic principles defined herein may be practiced in other embodiments without departing from the spirit or scope of the present disclosure. Thus, the present disclosure is not limited to the embodiments shown herein but falls within the widest scope consistent with the principles and novel features disclosed herein.

What is claimed is:

1. A method for quantifying a degree of blending of virgin asphalt and aged asphalt in a hot recycled asphalt mixture (HRAM) and controlling a composition of the HRAM, the method comprising:
    with a measurement module comprising a probe, measuring a microscale modulus of recycled asphalt, a microscale modulus of the aged asphalt, a microscale modulus of the virgin asphalt, and a content of the aged asphalt in the HRAM in situ;
    determining a microscale modulus of the recycled asphalt in a fully blended state with a microscale modulus prediction module, the microscale modulus prediction module being programmed with a function of the measured microscale modulus of the virgin asphalt, the measured microscale modulus of the aged asphalt, and the measured content of the aged asphalt measured in situ;
    with an acquisition module, determining the degree of blending of the virgin asphalt and the aged asphalt in the HRAM based on the microscale modulus of the recycled asphalt measured in situ and the microscale modulus of the recycled asphalt in the fully blended state; and
    controlling a level of a binder included in the HRAM based on the degree of blending of the virgin asphalt and the aged asphalt in the HRAM;

wherein the function of the microscale modulus prediction module is constructed as follows, as a relational equation between the microscale modulus of the recycled asphalt in the fully blended state and the content of the aged asphalt;

preparing the recycled asphalt in the fully blended state with different contents of the aged asphalt;

obtaining the microscale modulus of the recycled asphalt in the fully blended state with different contents of the aged asphalt; and establishing a mathematical relationship between the content of the aged asphalt and the microscale modulus of the recycled asphalt in the fully blended state by taking the content of the aged asphalt as the x-axis and the microscale modulus of the recycled asphalt in the fully blended state as the y-axis through nonlinear fitting:

$$E_{DMT-mix} = A \times 10^{10^{B[\alpha\ log\ log(E_{DMT-aged}) + (1-\alpha)log\ log(E_{DMT-virgin})]}},$$

where, $E_{DMT-mix}$ is the microscale modulus of the recycled asphalt in the fully blended state; $\alpha$ is the content of the aged asphalt in the recycled asphalt; $E_{DMT-aged}$ is the microscale modulus of the aged asphalt; $E_{DMT-virgin}$ is the microscale modulus of the virgin asphalt; and A and B are specific values.

2. The method according to claim 1, wherein a method for preparing the recycled asphalt in the fully blended state with different contents of the aged asphalt is as follows: adding virgin asphalt of different quality to the aged asphalt of a certain mass to prepare the recycled asphalt in the fully blended state with different contents of the aged asphalt.

3. The method according to claim 1, wherein a mold for preparing the recycled asphalt in the fully blended state with different contents of the aged asphalt is made of a high temperature resistant silica gel material.

4. The method according to claim 1, wherein a mold for preparing the recycled asphalt in the fully blended state with different contents of the aged asphalt is of a cuboid structure with the height of 7.5±0.5 cm and a bottom edge being a 9±0.5 cm*9±0.5 cm square.

5. The method according to claim 4, wherein the center of the cuboid mold is a cylinder depression with the height of 6±0.5 cm and the diameter of 7.5±0.5 cm.

6. The method according to claim 1, wherein the value A is 1.04, and the value B is 0.99.

7. The method according to claim 1, wherein the measurement module that measures the microscale modulus comprises an atomic force microscope (AFM).

8. The method according to claim 1, wherein the degree of blending of the virgin and aged asphalt is calculated as follows:

$$DOB = \frac{DMT_{mea} - DMT_{vir}}{DMT_{pre} - DMT_{vir}},$$

wherein DOB represents the degree of blending of the virgin and aged asphalt in the HRAM; $DMT_{mea}$ is the microscale modulus of the recycled asphalt measured in situ; $DMT_{pre}$ is the predicted microscale modulus of the recycled asphalt in the fully blended state; and $DMT_{vir}$ is the microscale modulus of the virgin asphalt measured in situ.

9. A system for quantifying a degree of blending of virgin and aged asphalt in HRAM and controlling a composition of the HRAM, comprising:

a relational equation construction module, configured to construct a relational equation between the microscale modulus of recycled asphalt in a fully blended state and the content of the aged asphalt;

an actual measurement module for microscale modulus, configured to measure the microscale modulus of the recycled asphalt, the microscale modulus of the aged asphalt, the microscale modulus of the virgin asphalt, and the content of the aged asphalt in the HRAM in situ;

a microscale modulus prediction module, configured to input the microscale modulus of the virgin asphalt, the microscale modulus of the aged asphalt, and the content of the aged asphalt measured in situ into the relational equation to obtain the microscale modulus of the recycled asphalt in the fully blended state; and an acquisition module for the degree of blending of the virgin and aged asphalt, configured to generate the degree of blending of the virgin and aged asphalt in the HRAM based on the microscale modulus of the recycled asphalt measured in situ and the microscale modulus of the recycled asphalt in the fully blended state, and establish a composition of a binder to be included in in the HRAM;

wherein the relational equation between the microscale modulus of the recycled asphalt in the fully blended state and the content of the aged asphalt is constructed as follow:

preparing the recycled asphalt in the fully blended state with different contents of the aged asphalt;

obtaining the microscale modulus of the recycled asphalt in the fully blended state with different contents of the aged asphalt; and establishing a mathematical relationship between the content of the aged asphalt and the microscale modulus of the recycled asphalt in the fully blended state by taking the content of the aged asphalt as the x-axis and the microscale modulus of the recycled asphalt in the fully blended state as the y-axis through nonlinear fitting:

$$E_{DMT-mix} = A \times 10^{10^{B[\alpha\ log\ log(E_{DMT-aged}) + (1-\alpha)log\ log(E_{DMT-virgin})]}},$$

where, $E_{DMT-mix}$ is the microscale modulus of the recycled asphalt in the fully blended state; $\alpha$ is the content of the aged asphalt in the recycled asphalt; $E_{DMT-aged}$ is the microscale modulus of the aged asphalt; $E_{DMT-virgin}$ is the microscale modulus of the virgin asphalt; and A and B are specific values.

* * * * *